United States Patent [19]

Ho et al.

[11] Patent Number: 5,302,638
[45] Date of Patent: Apr. 12, 1994

[54] ASPHALT/O-MODIFIED POLYETHYLENE

[75] Inventors: Kam Ho; Ludo Zanzotto, both of Calgary, Canada

[73] Assignee: Husky Oil Operations Ltd., Calgary, Canada

[21] Appl. No.: 941,924

[22] Filed: Sep. 8, 1992

[51] Int. Cl.⁵ .................. C08L 95/00; C08L 23/04
[52] U.S. Cl. ........................ 524/59; 524/68; 524/69; 524/70; 524/71
[58] Field of Search ................... 524/59, 68

[56] References Cited

U.S. PATENT DOCUMENTS

| | | | |
|---|---|---|---|
| 2,871,212 | 1/1959 | Thayer | 524/59 |
| 4,328,147 | 5/1982 | Chang et al. | 524/59 |
| 4,382,989 | 5/1983 | Chang et al. | 524/59 |
| 4,497,921 | 2/1985 | Chang et al. | 524/59 |
| 4,863,233 | 9/1989 | Moran | 524/59 |

*Primary Examiner*—Paul R. Michl
*Assistant Examiner*—Olga Asinovsky
*Attorney, Agent, or Firm*—Bruce E. Harang

[57] ABSTRACT

An asphalt blend used for paving is described. The blend contains polyethylene which has been modified by shearing action in the presence of an O-containing gas (such as oxygen or ozone). The blend has improved viscosity at high temperatures and reduced stiffness at low temperatures. A paving mix prepared using the asphalt blend has an improved Marshall Test Value (ASTM D1559), indicating that the paving mix should have a reduced tendency to become rutted under the load of traffic.

10 Claims, No Drawings

ASPHALT/O-MODIFIED POLYETHYLENE

FIELD OF THE INVENTION

One embodiment of this invention relates to a polymer modified asphalt paving composition having improved properties at elevated temperatures and at low temperatures. The paving composition comprises from 99 to 92 parts by weight asphalt and from 1 to 8 parts by weight of a polyethylene that has been modified by an O-containing gas.

Another embodiment of this invention relates to a process for preparing a polymer modified asphalt, wherein (a) a modified polymer suitable for improving the properties of asphalt is prepared by subjecting polyethylene to shearing conditions in the presence of a "O-containing gas" (for example, oxygen, ozone or a gas mixture containing oxygen and/or ozone); and (b) the so-modified polymer is mixed with asphalt.

BACKGROUND OF THE INVENTION

Asphalt is a widely used material of construction.

It is known to blend asphalts with polymeric materials so as to improve certain properties of the modified asphalt.

The use of polymer modifiers increases the cost of the final composition, so a cost-benefit analysis is required before commercial use becomes a reality.

For example, block styrene-butadiene elastomer (also known as "block SB rubber" and "block SBS rubber") is used to modify paving asphalts which are used in road construction. The so-modified paving asphalts typically exhibit excellent physical properties.

However, the cost of the block styrene-butadiene elastomer has restricted its use in paving applications. Thus, it is apparent that a need exists for a polymer modified asphalt that is conveniently prepared from a comparatively inexpensive polymer.

SUMMARY OF THE INVENTION

We have discovered new polymer modified asphalt compositions that are characterized by having both of increased viscosity at high temperatures (which is desirable, as increased viscosity has been associated with a decrease in the so-called "rutting" phenomenon which occurs in asphalt roads that are subjected to heavy traffic loads at high temperatures) and improved flexibility at low temperatures (which is also desirable, as improved flexibility has been associated with a decreased in the tendency of asphalt to crack when subjected to loads at low temperatures).

Thus, in one embodiment, the present invention provides a polymer modified asphalt composition consisting of:

(a) from 99 to 92 parts by weight of asphalt; and (b) from 1 to 8 parts by weight of an O-modified polyethylene, wherein said paving composition is characterized by having both of:

(X) improved viscosity at temperatures above 60° C.; and (Y) improved flexibility at temperatures below 0° C., wherein said O-modified polyethylene is prepared by subjecting a polyethylene thermoplastic to an O-containing gas.

We have also discovered a convenient process to prepare comparatively low cost polymer modified asphalt compositions. The process requires the initial preparation of an O-modified polyethylene by subjecting a polyethylene thermoplastic to shearing conditions in the presence of an O-containing gas. The O-modified polyethylene is subsequently mixed with asphalt. Thus, in another embodiment of the invention there is provided a process for the preparation of a polymer modified asphalt composition consisting of:

(a) preparing an O-modified polyethylene by subjecting a polyethylene thermoplastic to shearing conditions in a screw extruder in the presence of an O-containing gas; and (b) mixing said O-modified polyethylene with asphalt.

DETAILED DESCRIPTION OF THE PREFERRED EMBODIMENTS

The unmodified asphalt used in this invention may be any of the asphalts that are conventionally used in paving applications. Such asphalts may be obtained from different sources, such as natural occurring asphalt, vacuum distillation residue or hydrocracking residue. The use of asphalt derived as a residue from vacuum distillation is preferred. Asphalts may be further described by a so-called penetration value or "PEN". The measurement of PEN values is defined by ASTM D-5. While not intending to restrict the invention to any particular type of asphalt, it is preferred to use one that has a PEN value of from 50 to 300 dmm.

The O-modified polyethylene employed in this invention is prepared from a conventional polyethylene thermoplastic. The unmodified polyethylene thermoplastic may be a copolymer (i.e. a polymer of a major position of ethylene monomer and a minor portion of at least one other alpha olefin monomer) or a homopolymer. However, the unmodified polyethylene thermoplastic preferably should have a number average molecular weight ("Mn") of at least 10,000. While not wishing to be bound by any particular theory, it is believed that this minimum value of Mn is provides for the convenient modification of the polyethylene thermoplastic in the presence of O-containing gas, as outlined later in the disclosure.

The paving asphalt compositions of this invention contain from 99 to 92 parts by weight asphalt and from 1 to 8 parts by weight of an O-modified polyethylene. Preferred compositions contain from 2 to 5 parts by weight of O-modified polyethylene.

The term O-modified polyethylene is meant to refer to the material that is obtained when polyethylene thermoplastic is subjected to shearing conditions in the presence of gas which contains oxygen or ozone (such as oxygen, or ozone, or a gas mixture that contains added oxygen or ozone). It is especially preferred to utilize a gas mixture which contains ozone. The ozone may (for example) be generated from air or oxygen using a conventional electrostatic ozone generator.

The preferred O-modified polyethylene is characterized by (a) having a number average molecular weight Mn that is less than 80% of the number average molecular weight of the unmodified polyethylene thermoplastic and (b) having carbonyl functionality, as evidenced by the presence of a peak in the IR spectrum of the O-modified polyethylene at a location of about 1718 $cm^{-1}$.

The O-modified polyethylene is mixed with asphalt to prepare "paving asphalt compositions". Paving asphalt compositions are typically used as a binding agent, or "binder", in "paving mix" compositions. Paving mix compositions normally consist of from 4 to 8 weight percent of the binder and from 96 to 92 weight percent of an aggregate.

The present paving asphalt compositions are characterized by having improved viscosity at elevated temperatures (i.e. temperatures of greater than 60° C.) and improved flexibility at low temperatures. This combination of characteristics is highly desirable for use paving mix compositions which used in the construction of roads that are subjected to widely varied temperatures. Moreover, this combination of characteristics is not produced by all polymeric modifiers. (For example: some modifiers which improve high temperature viscosity produce an undesirable decrease in low temperature flexibility and, conversely, some modifiers which improve low temperature flexibility also produce an undesirable decrease in high temperature viscosity). Furthermore, the O-modified polyethylene that is employed in the present invention has a reduced tendency to phase-separate from the asphalt at the elevated temperatures that are required for road construction, as compared to the unmodified polyethylene (i.e. the O-modified polyethylene has good miscibility with the asphalt, which reduces the tendency to phase separate).

While not wishing to be bound by any particular theory, it is believed that the reduced tendency to phase-separate is because of the presence of polar groups on the O-modified polyethylene.

The process of this invention requires the use of a mixer which provides shearing conditions. "Shear rate" is often used to quantitatively described shearing conditions.

The calculation of shear rate is given by the formula:

$$\text{Shear rate } (S^{-1}) = \frac{C \times \text{rps}}{\text{tip clearance}}$$

where

C = circumference of mixing blade (cm).

rps = rotational speed of mixing blade (revolutions per second).

tip clearance = minimum distance between mixing blade and mixer body (cm).

The use of a mixer which provides a shear rate in excess of 300 $S^{-1}$ is preferred. Such mixers generally have a narrow tip clear clearance. A screw extruder is one example of a mixer which can provide the preferred shear rate (provided, of course, that the screw elements have sufficient diameter and/or the motor that drives the screw can provide the requisite rps.).

While not wishing to be bound by any particular theory, it is believed that the combination of shearing conditions and the O-containing gas leads to the generation of free radicals within the polyethylene thermoplastic. These free radicals, in turn, are believed to degrade the polyethylene thermoplastic via a chain scission reaction that also provides carbonyl functionality on the degraded polymer.

Thus, a combination of both of the use of an O-containing gas and shearing conditions is required in the present process. It is highly preferred to use a shear rate of at least 300 $S^{-1}$, together with the use of a gas stream which contains from 1 to 2 weight % ozone (as this combination of operating parameters is comparatively convenient, and has been surprisingly discovered to produce good results).

In addition to the above described conditions, the process of the present invention requires that the unmodified polyethylene thermoplastic have a minimum number average molecular weight Mn of 10,000. The use of a unmodified polyethylene having a lower Mn generally does not provide satisfactory results. (It is theorized that polyethylene having a lower Mn has too low a melt viscosity to allow the generation of sufficient free radicals under the shear conditions that are conveniently achievable in conventional screw extruders).

The process of this invention is then completed by mixing the above described O-modified polyethylene with asphalt. The mixing of the O-modified polyethylene and asphalt may be undertaken in any conventional asphalt mixing equipment (i.e. this mixing step does not require a high shear mixer-although the use of a high shear mixer is permissable).

Further details of the invention are provided by the following non-limiting examples.

EXAMPLE 1: Preparation of O-Modified Polyethylene

A commercially available, linear low density polyethylene ("LLDPE") was used in the experiments this example. The LLDPE was sold by Novacor Chemicals Ltd. of Canada under the name grade 150264 and was characterized by the following properties:

(a) melt flow index: 50 g/10 min (as measured by ASTM D1238 at 190° C., 2.16 kg load);

(b) molecular weight (Mn) 13,000; and (c) molecular weight (Mw) 40,000.

The above described LLDPE was subjected to shearing conditions in a twin screw extruder (manufactured by Leistritz A. G.) at a temperature of about 200° C., in the presence of oxygen or oxygen and ozone. The shear rate was calculated to about 350 $S^{-1}$.

When ozone was employed, it was generated from oxygen using a conventional electrostatic generator (supplied by Griffin Technic Corp, of Lodi, N.J.) and the ozone/oxygen mixture was then fed into the extruder via stainless fittings (i.e. ozone was added as part of an ozone/oxygen mixture). The concentration of ozone was not measured, but was estimated to be 1.2 weight %, based upon the operating conditions of the electrostatic generator and the calibration curve provided by the generator supplier.

The residence time of the LLDPE in the extruder was about 4 minutes. The use of ozone resulted in an O-modified polyethylene having a distinctive deep yellow color. Infra red analysis of this yellow material showed a peak at about 1718 $cm^{-1}$, which is indicative of carbonyl functionality. The O-modified polyethylene was pelletized and dried before being used in the experiments of Example 2.

Table 1 illustrates data which describe as-received LLDPE; O-modified LLDPE prepared in the presence of oxygen (according to the above described procedures) and O-modified LLDPE prepared in the presence of oxygen plus ozone (according to the above described procedures).

TABLE 1

| Material | Material Designation | Mw | Mn |
|---|---|---|---|
| LLDPE | PE | 40,000 | 13,000 |
| O-modified LLDPE (oxygen) | OPE | 31,000 | 10,000 |

TABLE 1-continued

| Material | Material Designation | Mw | Mn |
|---|---|---|---|
| O-modified LLDPE (ozone) | O₃PE | 25,000 | 8,000 |

EXAMPLE 2: Preparation of Modified Asphalt Blends

The preparation of the blends was completed as follows:
(a) asphalt was heated to a temperature of about 150° C. in a laboratory mixer (having a 0.5 horsepower motor) equipped with an agitator that was operated at a speed of between 2500 and 3000 revolutions per minute;
(b) O-modified LLDPE was gradually blended into the asphalt (in the amount shown in Table 2); and
(c) the temperature of the blend was gradually increased to 180° C., over a total mixing the period of 60 minutes.

The asphalt used in the preparation of the blends was a type that is generally referred to by those skilled in the art as "PEN 200/300" (i.e. it had a penetration value, or "PEN" of between 200 and 300 dmm at 25° C.).

The blends prepared according to the above described procedures were then tested to determine penetration value, dynamic viscosity at an elevated temperature (60° C.) and stiffness modulus at −20° C. In addition, the same tests were completed on three types of conventional asphalt, for comparison. Dynamic viscosity was measured using an instrument sold by Contraves (of Switzerland) under the name rheomat 155. The stiffness modulus was measured on a sliding plate rheometer manufactured by Shell Research N.V. of the Netherlands.

Table 2 also provides data from the tests. A review of Table 2 shows that conventional soft asphalt having a PEN of between 200 and 300 has a low stiffness modulus at −20° C. (which is desirable for asphalt which is subjected to low temperatures) but also a low viscosity at 60° C. (which is undesirable for asphalt which is subjected to high temperatures). Conversely, the conventional stiff asphalt having a PEN of between 85 and 100 is shown to having an undesirably high stiffness modulus at −20° C., though it does have a good viscosity at 60° C. The conventional medium grade asphalt having a PEN value between 150 and 200 is shown to have intermediate values of stiffness modulus at −20° C. and viscosity at 60° C.

In contrast to the conventional asphalts (which have undesirable properties at either low or high temperatures) the inventive blends have an excellent balance between dynamic viscosity at 60° C. and stiffness modulus at −20° C. (i.e. an excellent balance of properties at both of high and low temperatures). Table 2 also shows that unmodified LLDPE provides good properties when used in an amount of 4 weight % (comparative experiment C-1). However, the use of unmodified LLDPE does not constitute part of this invention because it is too incompatible with asphalt (i.e. it has a strong tendency to phase separate from the asphalt).

The blends containing 4 weight % of the O-modified LLDPE prepared with ozone/oxygen are especially noteworthy. (Three such blends were made, see experiments A, B, C). These blends have medium PEN values (from 160 to 165 dmm), very good values of stiffness modulus at −20° C. (from 18.6 to 25.8 MPA) and excellent viscosity values at 60° C. (from 458 to 649 Pa.S).

Specifically, the viscosity at 60° C. of the compositions of experiments A, B and C is substantially better than any of the conventional asphalts (including the "stiff" asphalt), yet the stiffness modulus at −20° C. is better than that of even the medium grade conventional asphalt.

TABLE 2

| | Asphalt/Modifier Blends | | |
|---|---|---|---|
| Experiment[1] | Modifier[2] (wt %) | PEN at 25° C., (dmm) | Dynamic Viscosity at 60° C. [Pa.S] | Stiffness Modulus at −20° C. [MPa] |
|---|---|---|---|---|
| C-1 | PE (4%) | 153 | 216 | 23.6 |
| A | O₃PE (4%) | 162 | 649 | 25.8 |
| B | O₃PE (4%) | 160 | 458 | 18.6 |
| C | O₃PE (4%) | 165 | 524 | 18.7 |
| D | O₃PE (3%) | 168 | 213 | 20.0 |
| E | O₃PE (2%) | 199 | 104 | 18.6 |
| F | O₃PE (4%) | 138 | 191 | 65.1 |
| G | O₃PE (5%) | 123 | 555 | 25.2 |
| C-2 | none | 96 | 197 | 103 |
| C-3 | none | 159 | 94 | 40 |
| C-4 | none | 261 | 50 | 10 |

Note:
[1]C-1, C-2, C-3, C-4 are comparative experiments.
[2]The asphalt/modifier blends contained the indicated modifier, in the bracketed amount (weight %).

EXAMPLE 3: Preparation of Paving Mix Compositions

Asphalt paving mix compositions typically contain a large portion of aggregate and a small portion of asphalt.

This example illustrates the preparation of paving mix compositions using the inventive modified asphalt described in Example 2.

The aggregate used in this example had a 16.0 mm top size grading. A sieve analysis of the aggregate is shown in Table 3.

Three comparative paving mix compositions were prepared using a medium viscosity asphalt (i.e. having a PEN value between 150 and 200).

Three inventive paving mix compositions were also prepared (using a modified asphalt blend containing 96% asphalt and 4% of O-modified LLDPE prepared with an ozone/oxygen mixture). The modified asphalt blend used in the inventive compositions was similar to the modified asphalt blends of experiments A, B, C of Example 2 (and thus, had a PEN value which was similar to the PEN value of the asphalt used in the comparative paving mixture compositions).

The compositions then were subjected to the so-called "Marshall Test" (ASTM D1599). The Marshall Test is used to determine the resistance to flow of asphaltic mixtures, and is considered to be indicative of the tendency of a paving mix composition to become "rutted" under the load of traffic.

TABLE 3

| Sieve Analysis of Aggregate | |
|---|---|
| Sieve Size mm | Percent Passing |
| 16.0 | 100 |
| 12.5 | 93 |
| 9.5 | 80 |
| 4.75 | 62 |
| 2.36 | 46 |
| 1.18 | 36 |
| 0.600 | 26 |
| 0.300 | 15 |
| 0.150 | 10 |
| 0.075 | 6.8 |

As shown in Table 4, the Marshall stability of the comparative paving mix compositions had a maximum value of 10,004 when 6.0 weight % asphalt was used in the mix. The Marshall stability of the comparative compositions was reduced by either increasing the amount of asphalt to 6.5% or decreasing it to 5.5%.

The behaviour of the inventive compositions was different. The Marshall stability of paving mixing compositions prepared using 5.5 or 6.0% weight % of modified asphalt was greater than 11,000. This result clearly indicates that the inventive modified asphalt should provide paving compositions having a reduced tendency to become "rutted".

TABLE 4

| Experiment | Binder Type | % Binder | Marshall Stability (N) |
|---|---|---|---|
| 1 | C-3[1] | 5.5 | 8,280 |
| 2 | C-3 | 6.0 | 10,044 |
| 3 | C-3 | 6.5 | 9,569 |
| 4 | O$_3$PE (4%)[2] | 5.5 | 11,777 |
| 5 | O$_3$PE (4%) | 6.0 | 11,145 |
| 6 | O$_3$PE (4%) | 6.5 | 9,434 |

Notes:
[1]Conventional 150/200 PEN asphalt (also used in experiment C-3 of Table 2).
[2]Asphalt/O-modified LLDPE blend containing 4 weight % LLDPE prepared in the presence of ozone (used in experiments A, B, C of Table 2).

What is claimed is:

1. A process for the preparation of polymer modified asphalt said process consisting of:
   (a) preparing an O-modified polyethylene by shearing a polyethylene thermoplastic in a screw extruder at a shear rate of at least 350 reciprocal seconds in the presence of an O-containing gas; and
   (b) mixing said O-modified polyethylene with asphalt.

2. The process according to claim 1, wherein said O-containing gas consists primarily of oxygen.

3. The process according to claim 1, wherein said O-containing gas contains from 1 to 2 weight % of ozone.

4. The process according to claim 1, wherein said polyethylene thermoplastic is a polymer of a major portion of ethylene and a minor portion of at least one other alpha olefin.

5. The process according to claim 1, wherein said polyethylene thermoplastic has a Mn molecular weight of at least 10,000.

6. The process according to claim 1, wherein said O-modified polyethylene has a molecular weight Mn that is less than 80% of the molecular weight Mn of said polyethylene thermoplastic.

7. The process according to claim 6, wherein said O-modified polyethylene contains carbonyl functionality which is characterized by having a peak on the IR spectrum at a location of about 1718 cm$^{-1}$.

8. The process according to claim 1, wherein said polymer modified asphalt contains from 99 to 92 parts by weight asphalt, and to a total of 100 parts by weight, from 1 to 8 parts by weight of said O-modified polyethylene.

9. The process according to claim 1, wherein said mixing is undertaken at a temperature of from 150° C. to 210° C.

10. The process according to claim 1, wherein said mixing is undertaken in a paddle-type mixer.

* * * * *